(12) United States Patent
Quintus et al.

(10) Patent No.: US 8,702,543 B2
(45) Date of Patent: *Apr. 22, 2014

(54) BELT TENSIONER

(75) Inventors: James G. Quintus, Sprngfield, OH (US); Edward A. Rammel, Bixby, OK (US)

(73) Assignee: Dayco IP Holding, LLC, Springfield, MO (US)

( * ) Notice: Subject to any disclaimer, the term of this patent is extended or adjusted under 35 U.S.C. 154(b) by 491 days.

This patent is subject to a terminal disclaimer.

(21) Appl. No.: 12/986,472

(22) Filed: Jan. 7, 2011

(65) Prior Publication Data

US 2011/0152023 A1    Jun. 23, 2011

Related U.S. Application Data

(63) Continuation of application No. 11/040,283, filed on Jan. 20, 2005, now Pat. No. 7,887,445.

(51) Int. Cl.
    *F16H 7/12* (2006.01)

(52) U.S. Cl.
    USPC .......................................... 474/135

(58) Field of Classification Search
    USPC .......................................... 474/135
    See application file for complete search history.

(56) References Cited

U.S. PATENT DOCUMENTS

| | | | |
|---|---|---|---|
| 4,351,636 A | 9/1982 | Hager | |
| 4,473,362 A | 9/1984 | Thomey et al. | |
| 4,698,049 A | 10/1987 | Bytzek et al. | |
| 4,826,471 A * | 5/1989 | Ushio | 474/135 |
| 4,917,655 A | 4/1990 | Martin | |
| 4,971,589 A | 11/1990 | Sidwell | |
| 5,011,460 A | 4/1991 | Ouchi et al. | |
| 5,083,984 A * | 1/1992 | Quintus et al. | 474/135 |
| 5,795,257 A * | 8/1998 | Giese et al. | 474/109 |
| 5,967,919 A | 10/1999 | Bakker | |
| 6,004,235 A * | 12/1999 | Ohta et al. | 474/109 |
| 6,206,797 B1 | 3/2001 | Quintus | |
| 6,264,578 B1 | 7/2001 | Ayukawa | |
| 6,422,963 B2 * | 7/2002 | Kurose | 474/101 |
| 6,682,452 B2 | 1/2004 | Quintus | |

(Continued)

FOREIGN PATENT DOCUMENTS

| | | |
|---|---|---|
| CN | 1502023 | 6/2004 |
| GB | 2230319 | 10/1990 |

(Continued)

OTHER PUBLICATIONS

CN, Notification of First Office Action, Chinese Application No. 201110157914.5 (Mar. 23, 2012).

(Continued)

*Primary Examiner* — William A Rivera
*Assistant Examiner* — Michael Riegelman
(74) *Attorney, Agent, or Firm* — Thompson Hine L.L.P.

(57) ABSTRACT

A tensioner for tensioning a belt that includes a support housing, an arm pivotably attached to the support housing, a spring operatively connected to the support housing and the arm, and a deflectable armplate seated on the arm and deflected into engagement with the support housing to provide an axial force that clamps the arm and the support housing together without axially compressing the spring. The spring biases the arm to pivot relative to the support housing.

11 Claims, 5 Drawing Sheets

(56) References Cited

U.S. PATENT DOCUMENTS

| | | | |
|---|---|---|---|
| 7,186,196 B2* | 3/2007 | Quintus | 474/135 |
| 7,497,794 B2* | 3/2009 | Lannutti et al. | 474/135 |
| 7,887,445 B2* | 2/2011 | Quintus et al. | 474/135 |
| 8,123,640 B2* | 2/2012 | Quintus et al. | 474/135 |
| 2002/0119850 A1* | 8/2002 | Dutil | 474/135 |
| 2003/0083164 A1 | 5/2003 | MacNaughton et al. | |
| 2004/0063531 A1 | 4/2004 | Cura et al. | |
| 2006/0100050 A1* | 5/2006 | Crist et al. | 474/135 |
| 2010/0323833 A1* | 12/2010 | Quintus et al. | 474/135 |

FOREIGN PATENT DOCUMENTS

| | | |
|---|---|---|
| JP | 73646/92 | 6/1992 |
| JP | 17252/93 | 3/1993 |
| WO | 02/068841 | 9/2002 |

OTHER PUBLICATIONS

CA, Office Action, Canadian Application No. 2,595,515 (Nov. 24, 2011).

KR, Notice of Preliminary Rejection, Korean Application No. 7018277/2007 (Feb. 28, 2012).

AU, Examiner's First Report, Application No. 2006206578, 2 pages (Nov. 4, 2010).

CN, First Office Action, Chinese Application No. 200680002766.7, 8 pages (Oct. 10, 2008).

CN, Second Office Action, Chinese Application No. 200680002766.7, 2 pages (Nov. 6, 2009).

CN, Third Office Action, Chinese Application No. 200680002766.7, 7 pages (Oct. 12, 2010).

EP, Communication regarding Intention to Grant, European Application No. 06718706.2, 7 pages (Jun. 13, 2008).

EP, Supplementary European Search Report, European Application No. 06718706.2, 6 pages (Jan. 23, 2008).

PCT, International Preliminary Report on Patentability, International Application No. PCT/US2006/001670, 3 pages (Oct. 1, 2007).

PCT, International Search Report, International Application No. PCT/US2006/001670, 3 pages (mailed Mar. 28, 2007; published Jun. 7, 2007).

PCT, Written Opinion, International Application No. PCT/US2006/001670, 3 pages (Mar. 28, 2007).

US, Office Action, U.S. Appl. No. 11/040,283 (Mar. 13, 2008).

US, Office Action, U.S. Appl. No. 11/040,283 (Oct. 16, 2008).

US, Advisory Action, U.S. Appl. No. 11/040,283 (Dec. 31, 2008).

US, Office Action, U.S. Appl. No. 11/040,283 (Aug. 4, 2009).

US, Office Action, U.S. Appl. No. 11/040,283 (Jan. 12, 2010).

US, Office Action, U.S. Appl. No. 11/040,283 (May 11, 2010).

US, Notice of Allowance, U.S. Appl. No. 11/040,283 (Oct. 27, 2010).

JP, Office Action, Japanese Application No. 2007-552222 (Jun. 14, 2011).

* cited by examiner

BELT TENSIONER

CROSS-REFERENCE TO RELATED U.S. PATENT APPLICATION

This application is a continuation of U.S. patent application Ser. No. 11/040,283 filed Jan. 20, 2005.

TECHNICAL FIELD

The present application relates generally to belt tensioners and more particularly to a belt tensioner with a round wire spring.

BACKGROUND

A tensioner is frequently utilized in a belt system to tension an endless belt that transmits power to accessories in an automobile engine. Tensioners typically use a spring, such as a flat wire or round wire spring to bias a pivot arm toward the belt. In tensioners employing a round wire spring, the round wire spring is compressed axially during assembly and is used to apply an axial force to the pivot arm. This axial spring force is used to maintain pivot arm alignment during use.

SUMMARY

In one aspect, tensioners for tensioning a belt are disclosed that include a support housing, an arm pivotably attached to the support housing, a spring operatively connected to the support housing and the arm, and a deflectable armplate seated on the arm and deflected into engagement with the support housing to provide an axial force that clamps the arm and the support housing together without axially compressing the spring. The spring biases the arm to pivot relative to the support housing.

In another aspect, tensioners for tensioning a belt are disclosed that include a support housing having a pivot arm rotatably mounted thereto to form a spring cavity, a spring disposed in the spring cavity and operatively connected to the arm and support housing, and a deflectable armplate seated on the arm and deflected into engagement with the support housing. The engagement of the armplate and support housing provides an axial force that clamps the arm and the support housing together. In this embodiment, the support housing and the pivot arm each have cooperating stops. Each stop includes a stop surface capable of engaging the other stop's stop surface to place the pivot arm in an unloaded position. The stop of the support housing extends from an upper surface thereof and includes a relatively flat surface region and a relatively angled surface region. The stop of the pivot arm includes a relatively flat surface region and a relatively angled surface region. The angled surface regions of both stops cooperate to allow the stop of the pivot arm to slide along the flat surface region of the stop of the support housing.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1A is a side view of an unloaded round wire spring of the belt tensioner of FIG. 1;

DETAILED DESCRIPTION

Figure 1:
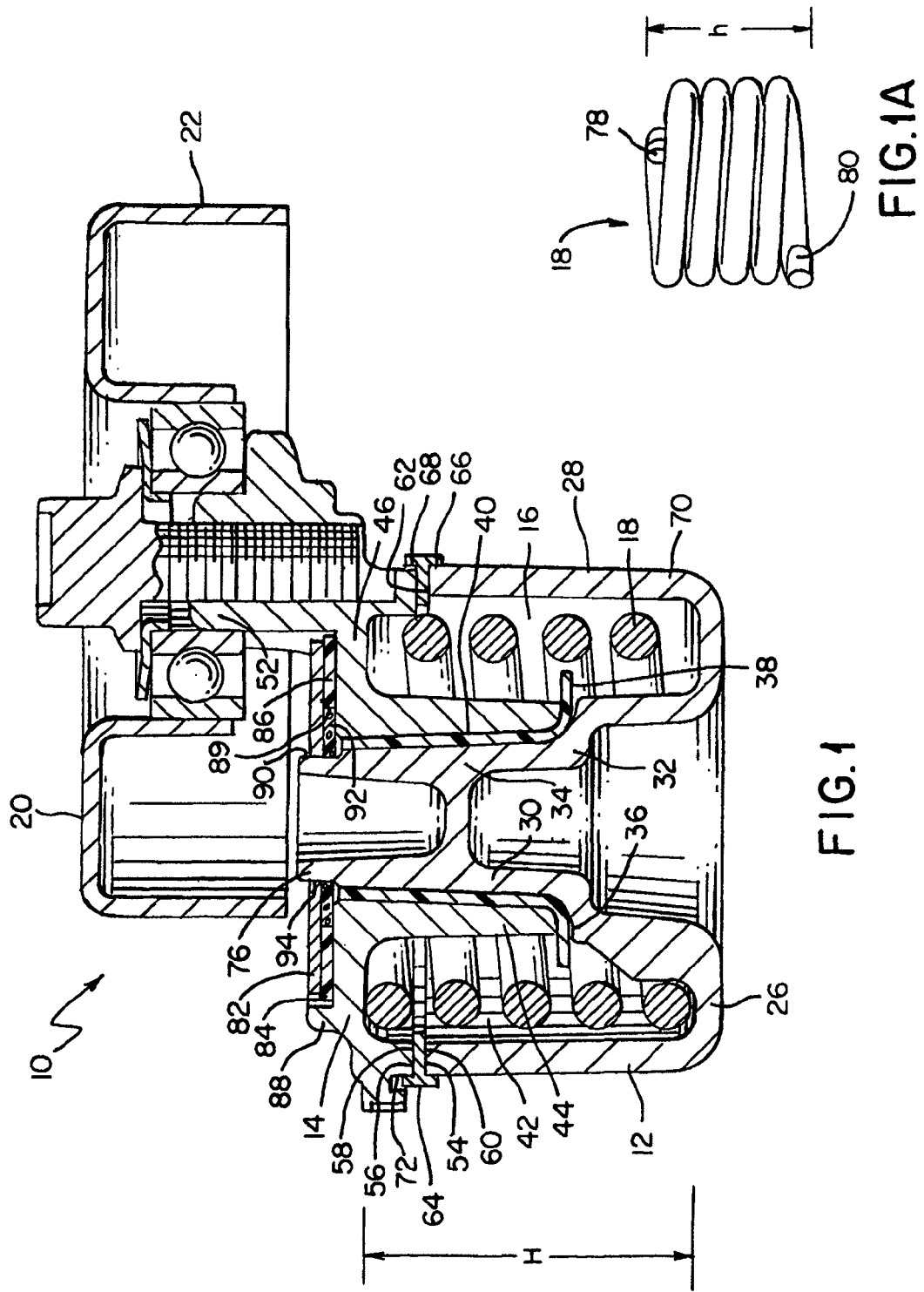
FIG. 1 is a section view of a belt tensioner according to one embodiment.
Figure 6:
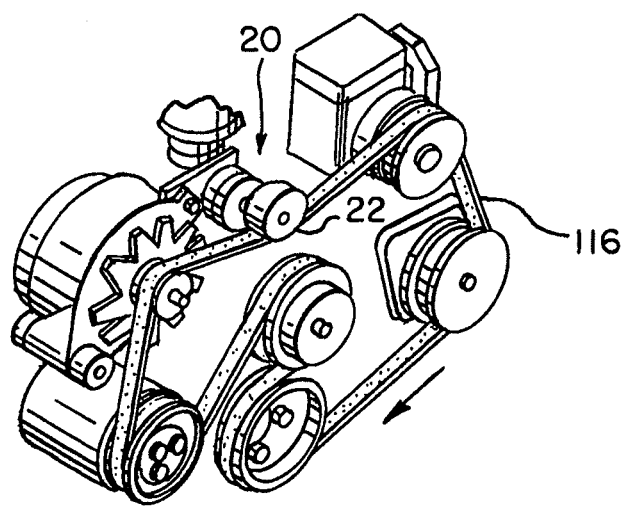
FIG. 6 is a schematic view of the belt tensioner of FIG. 1 engaging an automotive transmission belt.

Referring to FIG. 1, a belt tensioner 10 includes a support housing 12 and a pivot arm 14 rotatably mounted to the support housing to form a spring cavity 16 therebetween. Located within the spring cavity 16 and operatively connected to both the pivot arm 14 and the support housing 12 is a round wire, helical spring 18. The round wire spring 18 applies a force to the pivot arm 14 during use to bias the pivot arm toward an unloaded position. The pivot arm 14 carries a pulley 20, such as a front or backside idler pulley, that can rotate relative to the pivot arm. The pulley 20 has a belt-engaging surface 22 for engaging a belt 116, such as an automotive transmission belt (FIG. 6). As will be described in greater detail below, the spring cavity 16 has a height H that is greater than an unloaded height h of the round wire spring 18 (FIG. 1A) effectively isolating the round wire spring from axial compression forces applied, for example, to maintain pivot arm alignment and to provide friction damping.

Figure 2:
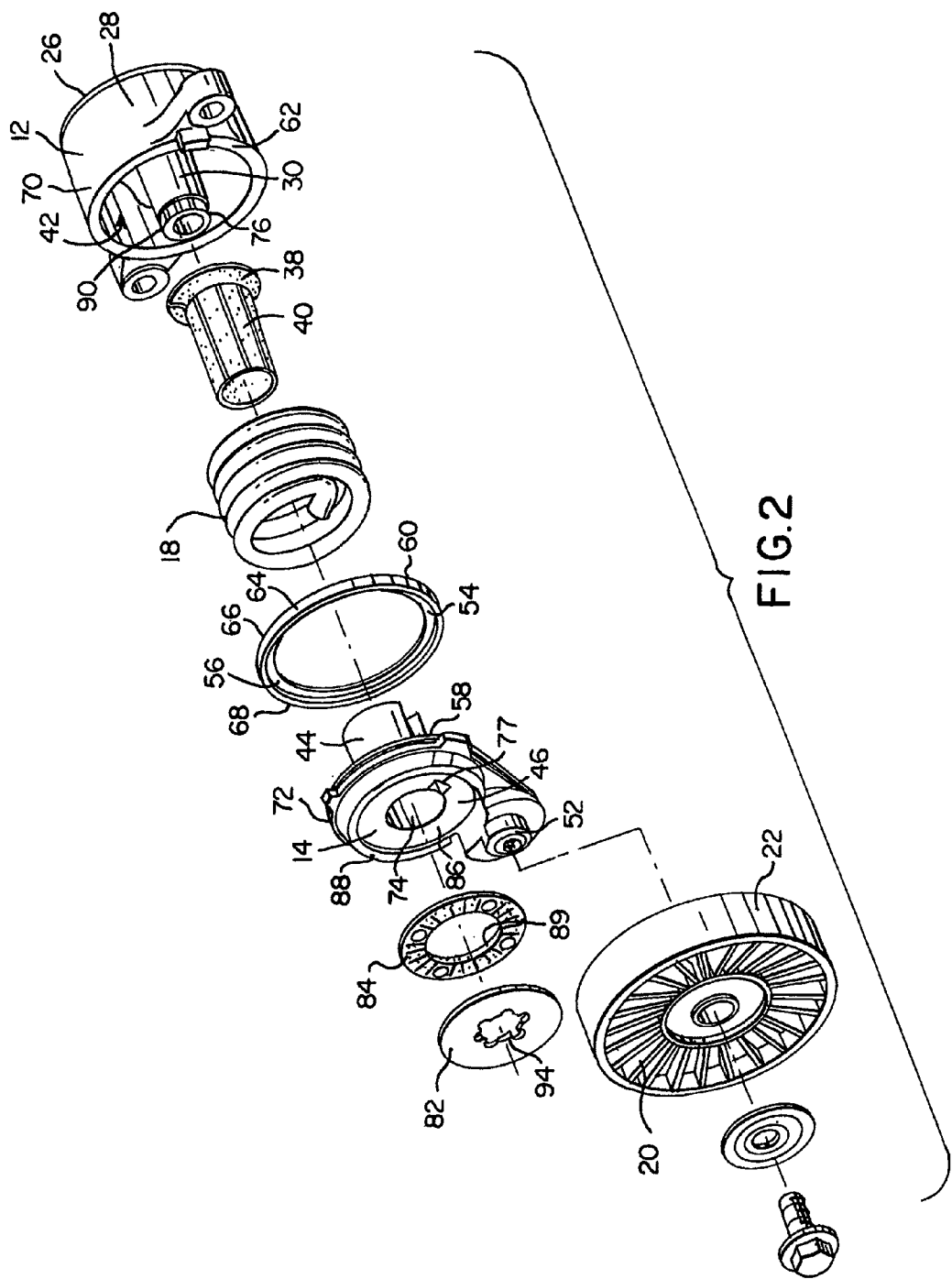
FIG. 2 is an exploded view of the belt tensioner of FIG. 1.

Referring also to FIG. 2, the support housing 12 includes a base 26, an outer wall 28 and an alignment member 30 extending upwardly from the base and centrally located within a recess 42 formed by the outer wall and the base. The alignment member 30 has an enlarged proximal portion 32, a relatively narrower distal portion 34 and a transition therebetween (FIG. 1) forming a seating surface 36 that is shaped to receive a base portion 38 of a pivot bushing 40 (e.g., formed of molded plastic).

The pivot arm 14 includes a sleeve 44 sized to receive both the pivot bushing 40 and the alignment member 30, an upper wall 46 extending outwardly from the sleeve, an opening 74 sized to receive an end 76 of the alignment member 30 and a pulley support 52 connected to the upper wall at a location offset from the opening 74. Each of the pivot arm 14 and support housing 12 can be formed of any suitable material, including metal or polymer and can be formed by any suitable method, such as casting, machining and/or molding.

Positioned between the pivot arm 14 and the support housing 12 is a spring bushing 54 (e.g., formed of molded plastic). Spring bushing 54 has an upper surface 56 that can be placed in continuous (i.e., unbroken) annular contact with a lower edge 58 of the pivot arm 14 and a lower surface 60 that that can be placed in continuous annular contact with an upper edge 62 of the support housing 12. This continuous annular contact can maximize surface area contact between the spring bushing—pivot arm—support housing assembly, which can provide increased friction damping of the pivot arm during use. Alternatively, in other embodiments, contact between the upper surface 56 and lower edge 58 and/or contact between lower surface 60 and upper edge 62 may not be continuous.

A flange 64 extends about a periphery of the spring bushing 54. The flange 64 has inner surfaces 66 and 68 configured to extend over an outer surface 70 of the support housing 12 and an outer surface 72 of the pivot arm 14, respectively, e.g., to provide a labyrinth-type seal between the pivot arm and the support housing. This seal can inhibit passage of foreign agents, e.g., dirt, oil, etc. into the spring cavity, which can affect the tensioner's operation. In some embodiments, the spring bushing may not include a flange or the flange may extend over only one of the outer surfaces 70 or 72.

Figure 3:
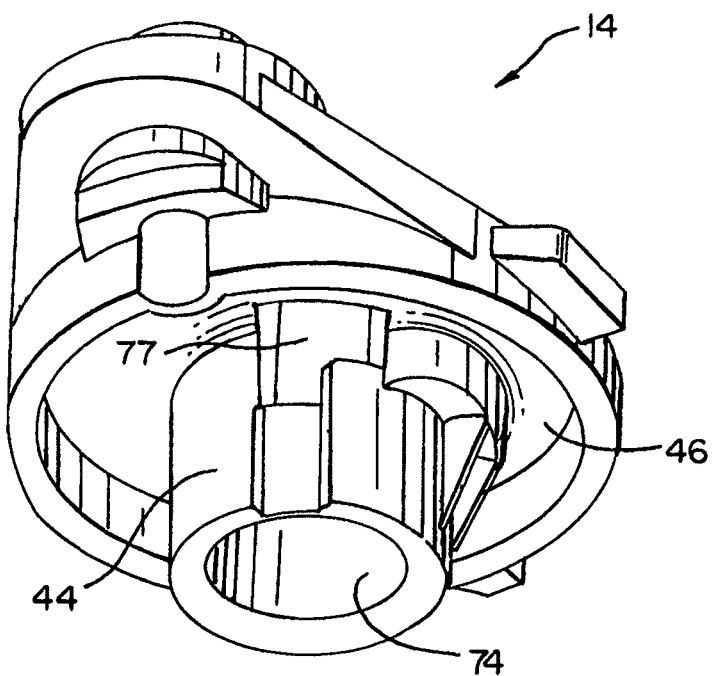
FIG. 3 is a perspective view of a pivot arm of the belt tensioner of FIG. 1.
Figure 4:
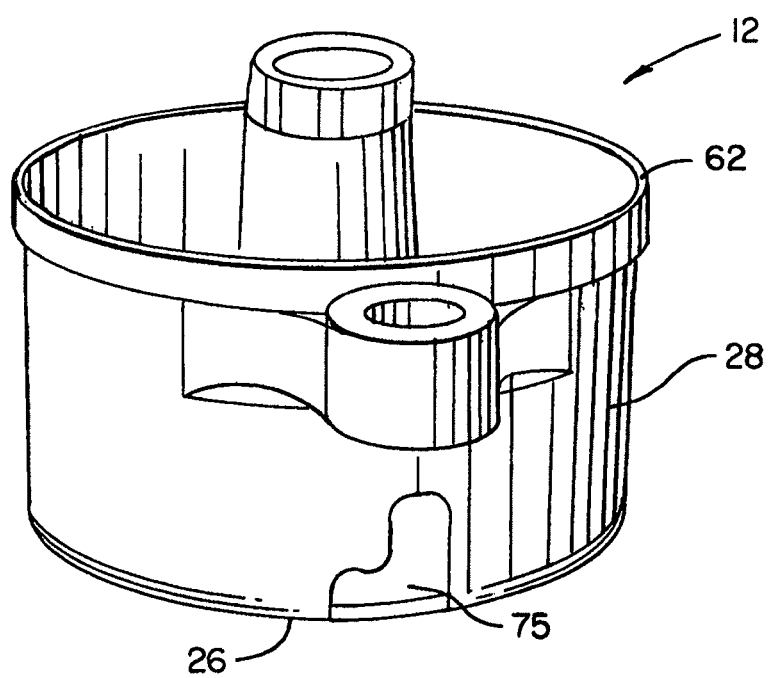
FIG. 4 is a perspective view of a support housing of the belt tensioner of FIG. 1.

As noted above, round wire spring 18 biases the pivot arm 14 toward an unloaded position during use. Referring to FIGS. 3 and 4, to operatively connect the round wire spring 18 to each of the support housing 12 and the pivot arm 14, slots 75 and 77 are provided. As shown, the slots 75 and 77 are L-shaped, however, any suitable shape can be used. Referring to FIGS. 1A and 3, the pivot arm 14 includes slot 77 that is sized to receive an inwardly facing end 78 of round wire spring 18. In the illustrated embodiment, slot 77 extends only partially into sleeve 44 and through upper wall 46 at a location adjacent opening 74 (FIG. 2). Referring now to FIGS. 1A and 4, the support housing 12 includes slot 75 extending through outer wall 28 that is sized to receive an outwardly facing end 80 of round wire spring 18. The slot 75 is located near base 26 at a location spaced-apart from the upper edge 62 of the support housing 12. In some cases, slot 75 extends only partially through outer wall 28.

Figure 5A:
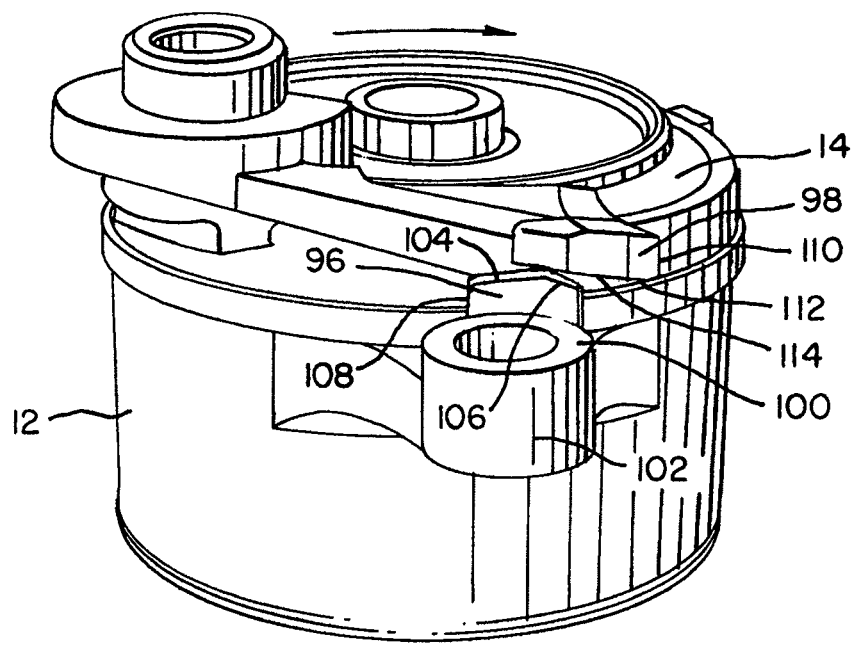
FIGS. 5A-5C are perspective views of the belt tensioner of FIG. 1 with the pulley removed.
Figure 5B:
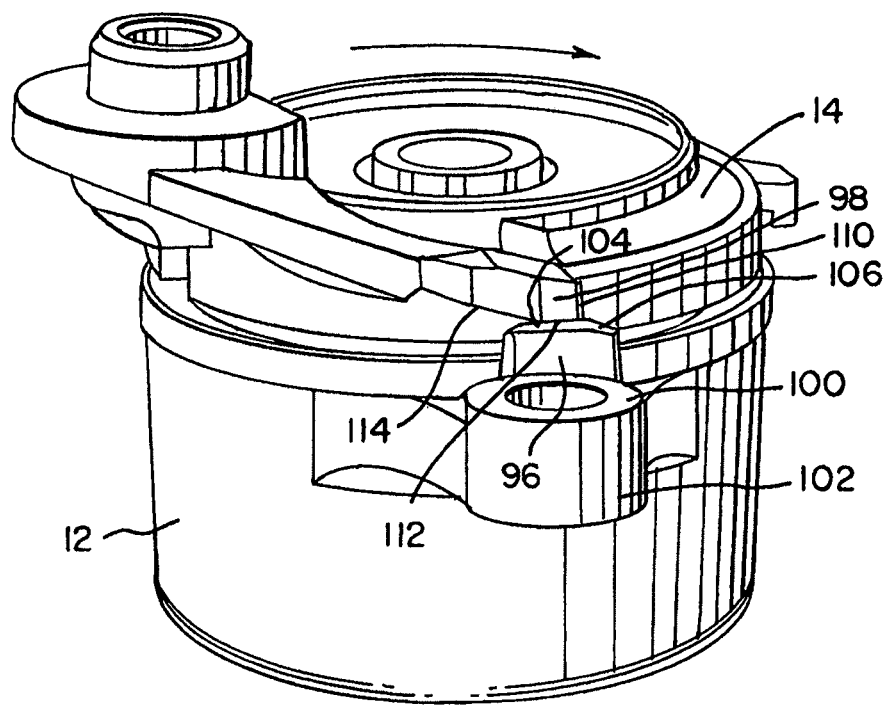
Figure 5C:
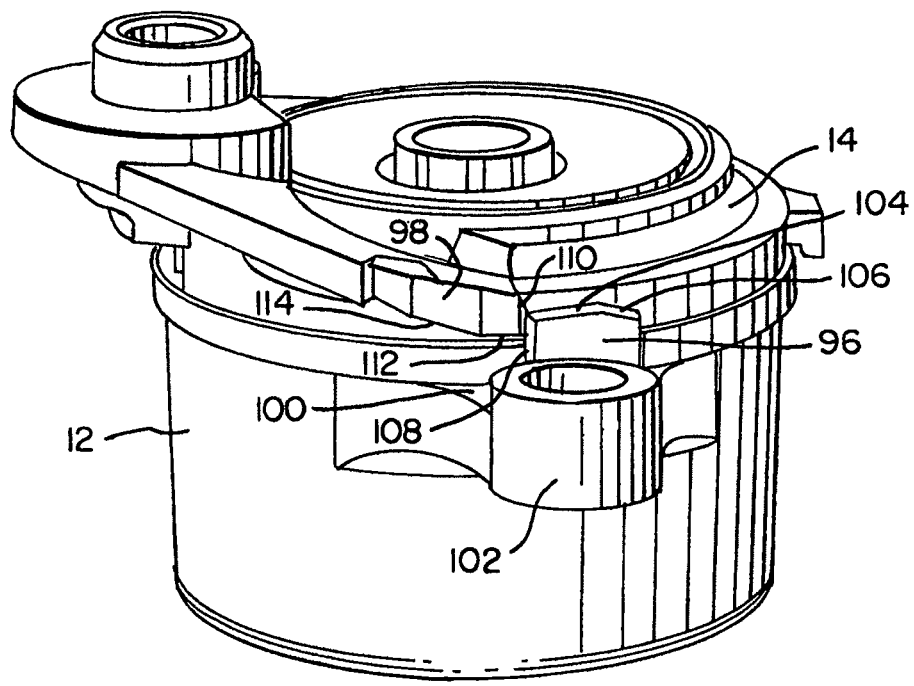

With the spring operatively connected to the pivot arm 14 and the support housing 12, biasing force can be applied to the pivot arm merely by rotating one of the pivot arm and support housing relative to the other. Referring to FIGS. 5A-5C, the support housing 12 and the pivot arm 14 each include cooperating stops 96 and 98, respectively. Stop 96 extends upwardly from an upper surface 100 of support mount 102 and includes a relatively flat surface region 104, a relatively angled surface region 106 and a stop surface 108 capable of engaging a stop surface 110 of stop 98. Stop 98 also includes a relatively flat surface region 112 and a relatively angled surface region 114. Referring particularly to FIGS. 5A and 5B, the angled surface regions 106 and 114 of the stops 96 and 98 cooperate to allow stop 98 to slide along the flat surface region 104 of stop 96 during rotation. Referring particularly to FIG. 5C, once stop surface 110 of stop 98 passes stop surface 108 of stop 96, the stop surfaces engage to inhibit counter-rotation due to the biasing force, thus placing the pivot arm 14 in the unloaded position.

Referring back to FIGS. 1 and 2, the assembly is clamped or compressed together by an axial compression force using an armplate 82 (e.g., formed of spring steel) and plate bushing 84 (e.g., formed of plastic). The plate bushing 84 is sized to fit within a seating portion 86 of the pivot arm 14. A raised rim 88 extends about the seating portion 86 to align the plate bushing once seated within the seating portion. As can be seen, the plate bushing 84 has an inner surface 88 that is spaced-apart from an outer surface 90 of the alignment member 30 forming a gap 92 therebetween. Referring particularly to FIG. 1, during radially riveting the armplate 82 to the alignment member 30, inner edge 94 of the armplate is elastically deflected into gap 92 formed between inner surface 89 and outer surface 90. This elastic deflection biases the assembly together thereby affecting sliding friction between the rotational and stationary parts of the tensioner 10 and serves to align the pivot arm 14 during use. Using an armplate and plate bushing to provide an axial clamping force is described in greater detail in U.S. Pat. No. 6,206,797, the details of which are incorporated by reference as if fully set forth herein.

As noted above, referring now to FIGS. 1 and 1A, the height H (e.g., greater than 41 mm, such as about 42.2 mm) of the spring cavity 16 is greater than the unloaded height h (e.g., less than about 42.2 mm, such as about 41 mm) of the round wire spring 18. As a result, no axial force is transmitted to the round wire spring 18 due to the axial compression force applied by the armplate 82, nor does the axial compression force have to overcome any axial spring force applied by the spring to bias the assembly together. As such, the round wire spring 18 is effectively isolated from the axial compression force applied by the armplate 82. Also, in some embodiments, because H of the spring cavity 16 is greater than h of the round wire spring 18, an axial compression force need not be applied to maintain the pivot arm's spring biased, unloaded position as there is no axial spring force applied to the pivot arm that would cause the pivot arm to disengage the support housing 12. Further, use of a round wire spring 18 can, in some cases, provide packaging benefits, such as in cases where it is difficult to package a flat wire spring.

A number of detailed embodiments have been described. Nevertheless, it will be understood that various modifications may be made. For example, while an armplate and plate bushing clamping arrangement has been described, other suitable compression devices may be used, such as a Belleville or wave spring. Accordingly, other embodiments are within the scope of the following claims.

What is claimed is:

1. A tensioner for tensioning a belt, the tensioner comprising:
   a support housing having a pivot arm rotatably mounted thereto to form a spring cavity, the support housing and the pivot arm each having cooperating stops, each stop including a slide surface and a stop surface;
   a spring disposed in the spring cavity and operatively connected to the arm and support housing; wherein the spring biases the arm to pivot relative to the support housing; and
   a deflectable armplate seated on the arm and deflected into engagement with the support housing, wherein engagement of the armplate and support housing provides an axial force that clamps the arm and the support housing together;
   wherein the pivot arm, during assembly with the spring connected to the pivot arm and to the support housing, transitions from a partially unassembled position to an assembled, unloaded position by rotating the pivot arm in a direction that slides the slide surface of the stop of the pivot arm along the slide surface of the stop of the support housing until the stop surface of the stop of the pivot arm passes over the stop of the support housing and the respective stop surfaces engage each other;
   wherein the stop of the support housing extends from an upper surface thereof and its slide surface includes a relatively flat surface region and a relatively angled surface region, and the slide surface of the stop of the pivot arm includes a relatively flat surface region and a relatively angled surface region, and wherein the angled surface regions of both stops cooperate to allow the stop of the pivot arm to slide along the flat surface region of the stop of the support housing.

2. The tensioner of claim 1 further comprising a spring bushing disposed between the support housing and the pivot arm.

3. The tensioner of claim 2, wherein the spring bushing includes a flanged outer rim that extends over an outer surface of at least one of the pivot arm and support housing.

4. The tensioner of claim 2, wherein the flanged outer rim of the spring bushing extends over the outer surface of both the pivot arm and the support housing.

5. The tensioner of claim 1, wherein the spring is a flatwire or a round wire spring.

6. The tensioner of claim 5, wherein the spring is not axially compressed when disposed in the spring cavity.

7. The tensioner of claim 1, wherein the spring applies no axial force to the arm when the spring is disposed in the spring cavity and the arm is pivotably attached to the support housing.

8. The tensioner of claim 1, wherein the support housing includes an alignment member therein that has an enlarged proximal portion, a relatively narrower distal end and a transition therebetween that forms a seating surface, and further comprises a pivot bushing having a flange, wherein the flange is seated on the seating surface of the alignment member.

9. The tensioner of claim 8, wherein the pivot arm includes a sleeve sized to receive both the pivot bushing and the alignment member with the pivot bushing juxtaposed to both the sleeve and the alignment member.

10. The tensioner of claim 8 further comprising a plate bushing positioned between the deflectable armplate and the arm, the plate bushing being spaced-apart from the alignment member to define a gap; wherein the deflectable armplate is deflected into the gap to engage the alignment member of the support housing.

11. The tensioner of claim 10 wherein the deflectable armplate has a splined connection to the alignment member.

* * * * *